(12) United States Patent
Hanley

(10) Patent No.: US 9,815,414 B1
(45) Date of Patent: Nov. 14, 2017

(54) HITCH MOUNTED ATTACHMENT FOR TRANSPORTING SNOW BLOWER

(71) Applicant: Thomas M. Hanley, Getzville, NY (US)

(72) Inventor: Thomas M. Hanley, Getzville, NY (US)

(*) Notice: Subject to any disclaimer, the term of this patent is extended or adjusted under 35 U.S.C. 154(b) by 0 days.

(21) Appl. No.: 15/434,448

(22) Filed: Feb. 16, 2017

Related U.S. Application Data

(60) Provisional application No. 62/295,721, filed on Feb. 16, 2016.

(51) Int. Cl.
  *B60R 9/06* (2006.01)
  *B60R 11/06* (2006.01)
  *B60R 11/00* (2006.01)

(52) U.S. Cl.
  CPC ............... *B60R 9/06* (2013.01); *B60R 11/06* (2013.01); *B60R 2011/004* (2013.01)

(58) Field of Classification Search
  CPC ...... B60R 9/06; B60R 11/06; B60R 2011/004
  See application file for complete search history.

(56) References Cited

U.S. PATENT DOCUMENTS

| | | | | |
|---|---|---|---|---|
| 4,881,864 A * | 11/1989 | Amato | ............... | B66C 23/44 212/180 |
| 5,567,107 A * | 10/1996 | Bruno | ............... | B60R 9/06 241/200 |
| 5,938,395 A * | 8/1999 | Dumont, Jr. | ............... | B60R 9/06 224/497 |
| 6,050,548 A * | 4/2000 | Leger | ............... | B66C 23/48 254/326 |
| 6,599,078 B1 * | 7/2003 | Elder | ............... | B60P 1/5471 212/180 |
| 7,607,546 B1 * | 10/2009 | Hopper | ............... | B66C 23/44 212/180 |
| 7,845,622 B1 * | 12/2010 | Riggs | ............... | B66C 23/44 212/180 |
| 9,055,738 B1 * | 6/2015 | Woller | ............... | A01M 31/006 |
| 2013/0255113 A1 * | 10/2013 | Carroll | ............... | B60R 9/06 37/241 |

* cited by examiner

*Primary Examiner* — Corey Skurdal
(74) *Attorney, Agent, or Firm* — Phillips Lytle LLP; David L. Principe

(57) ABSTRACT

An attachment for mounting onto a hitch receiver on a vehicle. The attachment is used for transporting a snow blower. The snow blower has wheels, an engine, a front housing and a pair of arms. The attachment comprises a drawbar. A base is supported by the drawbar. An elongate member is supported by the drawbar and has a support surface disposed above and in spaced apart relation to the base. The base is configured and arranged to support the front housing of the snow blower. The base also is configured and arranged to establish a fulcrum as the arms of the snow blower are rotated forward until the snow blower makes contact with the support surface.

21 Claims, 10 Drawing Sheets

HITCH MOUNTED ATTACHMENT FOR TRANSPORTING SNOW BLOWER

CROSS-REFERENCE TO RELATED APPLICATION

The present invention claims priority benefit from U.S. Provisional Patent Application No. 62/295,721 entitled "Hitch Mounted Attachment for Transporting Snow Blower" filed Feb. 16, 2016, which is incorporated herein by reference.

FIELD OF THE INVENTION

The present invention pertains generally to hitch mounted transport devices and specifically to a hitch mounted attachment for transporting a walk behind snow blower.

BACKGROUND OF THE INVENTION

During winter there is sometimes a need to clear snow from more than one location with a snow blower. For example, owners of more than one property may need to clear snow from properties at different locations. Also, there may be a need to clear snow from a second location such as the property of a relative. Walk behind snow blowers come in many sizes and typically require more than one person to lift them. A walk behind snow blower can be carried in the bed of a pickup truck or in a van, but the effort involved in lifting the snowblower into the truck or van is a major drawback. There have been platforms for attaching to a hitch receiver for transporting items such as coolers, barbecue grills or the like. What is needed is a hitch mounted attachment for transporting a snow blower that is safe, easy to use, and that eliminates the drawbacks set forth above.

SUMMARY OF THE INVENTION

The present invention meets the above described need by providing an attachment for mounting onto a hitch receiver on a vehicle. The attachment is used for transporting a snow blower. The snow blower has wheels, an engine, a front housing and a pair of arms. The attachment comprises a drawbar. A base is supported by the drawbar. An elongate member is supported by the drawbar and has a support surface disposed above and in spaced apart relation to the base. The base is configured and arranged to support the front housing of the snow blower. The base also is configured and arranged to establish a fulcrum as the arms of the snow blower are rotated forward until the snow blower makes contact with the support surface.

In a further embodiment, the present invention provides an attachment for mounting onto a hitch receiver on a vehicle. The attachment is used for transporting a snow blower. The snow blower has wheels, an engine, a front housing and a pair of arms. The attachment includes a drawbar having a first end and a second end. The first end is configured and arranged to mount into the hitch receiver. The second end supports a plate and a post. The post has a distal end with a support surface. The support surface is spaced apart horizontally and vertically from the base. The base is configured and arranged to support the front housing of the snow blower to establish a fulcrum point as the arms of the snowblower are rotated forward about the fulcrum point until the snow blower contacts the support surface.

In another embodiment, the present invention provides an attachment for mounting on a hitch receiver and for transporting a snow blower. The snow blower has wheels, an engine, a front housing, and a pair of arms. The attachment comprises a drawbar having a first end and a second end disposed opposite from the first end. The first end is configured and arranged to engage with the hitch receiver. The second end has a collar with a vertical opening extending therethrough. The collar has openings defined therein. An L-shaped member has a base mounted at a first end of a first portion and has a hollow second portion having a plurality of side openings defined therein. A pin adjustably connects the L-shaped member to the collar. The pin is configured and arranged to extend through the plurality of side openings in the collar and through the openings in the L-shaped member. An elongate post is configured and arranged to attach to the second end of the L-shaped member. The post extends vertically and horizontally from a proximal end at the second end of the L-shaped member to a distal end. A lateral support member is disposed at the distal end of the post. The base is configured and arranged to support the front housing of the snow blower and to establish a fulcrum as the arms of the snow blower are rotated forward until the snow blower makes contact with the lateral support member.

In another embodiment, the present invention provides an attachment for mounting onto a hitch receiver on a vehicle. The attachment is for transporting a snow blower. The snowblower has wheels, a front housing, a pair of arms, and a cross bar disposed between the arms. The attachment comprises a drawbar having a first end and a second end. The first end is configured and arranged to mount into the hitch receiver.

A post has a first end and a second end opposite the first end. The post is mounted to the second end of the drawbar.

A base is attached to the first end of the post.

A support member is pivotally attached to the second end of the post. The support member has a J-shaped portion at a distal end. The J-shaped portion is configured and arranged to receive the cross bar on the snowblower when the snowblower is mounted on the base.

A retention member is configured and arranged to mount to the post and to slide relative thereto. The retention member extends laterally from the post such that when the snowblower is mounted on the base the retention member can be fixed at a position on the post where the retention member engages with the top of the front housing on the snowblower to prevent rotation of the front housing relative to the base.

DESCRIPTION OF THE EMBODIMENT

Figure 1:
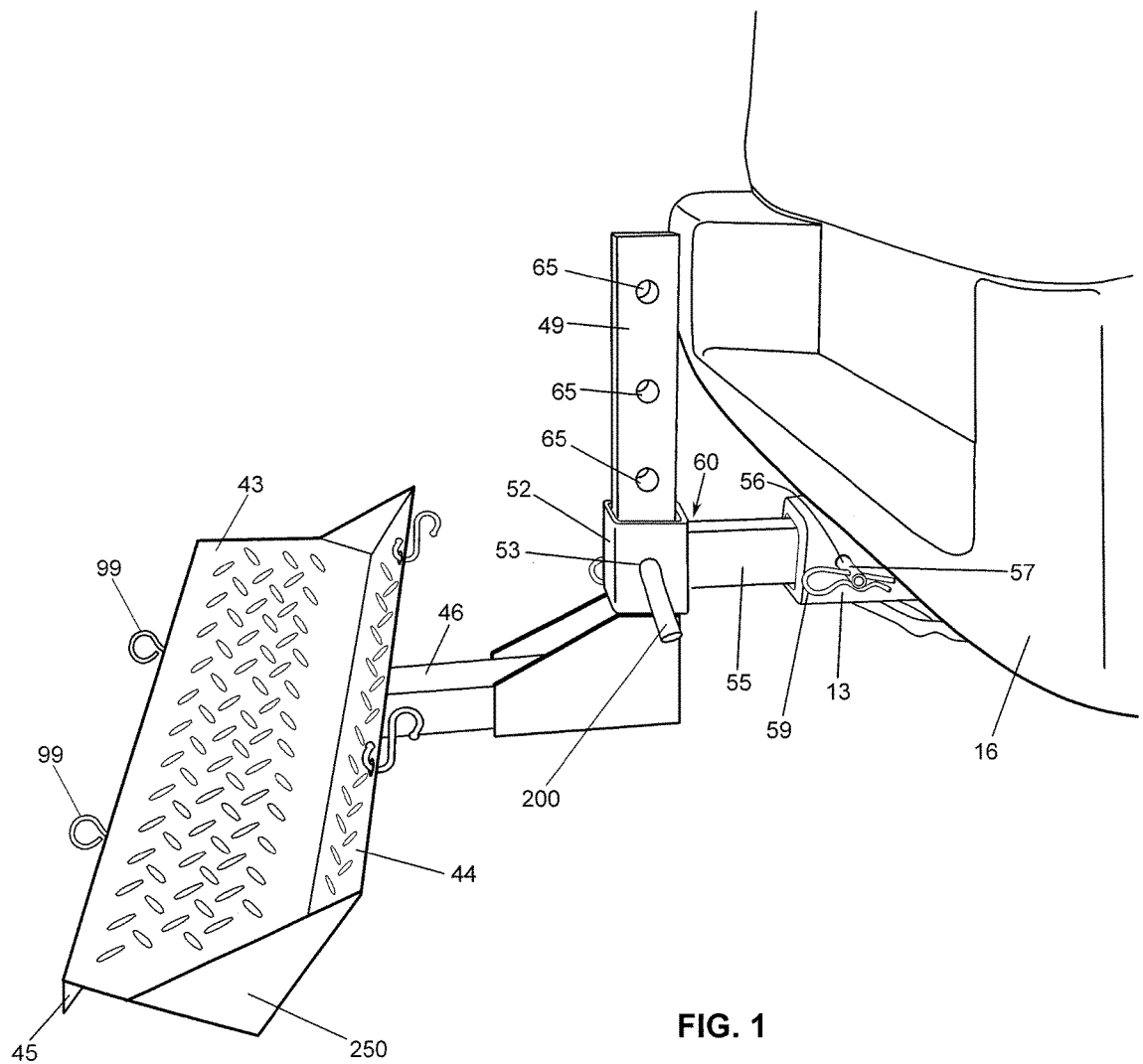
FIG. 1 is a perspective view of a portion of an adjustable height hitch mounted attachment according to the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

In FIG. 1, a hitch receiver 13 is mounted on a vehicle 16. The hitch receiver 13 has an opening for receiving a horizontal draw bar 55. The drawbar 55 has an outside dimension smaller than the inside dimension of the hitch receiver 13 such that the drawbar 55 is capable of sliding in and out of the opening in the hitch receiver 13 in telescoping fashion. An opening 56 in the hitch receiver 13 aligns with an opening (not shown) in the drawbar 55. A pull pin 57 is inserted through the aligned openings in the drawbar 55 and the hitch receiver 13 to connect the draw bar 55 to the hitch receiver 13. The pull pin 57 may be secured by a cotter pin 59.

The end 60 of the drawbar 55 disposed opposite from the hitch receiver 13 has a collar 52 with a top and a bottom opening that are connected to form a vertical channel through the collar 52. The collar 52 has openings on opposite sides for receiving a pin 200. A base 43 is connected to a horizontal bar 46. The base 43 shown is a solid metal plate with a horizontal portion and a forward angled wall 44. The base 43 may take other shapes and forms including an open grid, etc. as will be evident to those persons of ordinary skill in the art based on this disclosure. The horizontal bar 46 is connected to a vertical post section 49. The vertical post section 49 is hollow and has a plurality of openings 65 disposed along its length. The vertical post section 49 slides up and down through the vertical channel in the collar 52. Accordingly, the height of the base 43 can be adjusted relative to the ground by sliding the vertical post section 49 through the vertical channel in the collar 52 and aligning one of the openings 65 in the vertical post section 49 with the openings 53 in the collar 52. Once the openings 65 and 53 are aligned and the height of the base 43 is set at the proper distance from the ground, the pin 200 may be inserted through the aligned openings to fix the position of the base 43 above the ground. If the hitch receiver 13 is raised farther above the ground such as for a large truck or sport utility vehicle, the extra openings 65 provide for adjustment to extend the vertical post 49 closer to the ground. Alternatively, for a car or van the hitch receiver 13 may be closer to the ground. In that case the vertical post section 49 does not need to extend as far below the collar 52. The base 43 may also be provided with hooks 99 for attaching straps around a front housing 22 (FIG. 5) to further secure a snowblower 19 as described herein.

Figure 2:
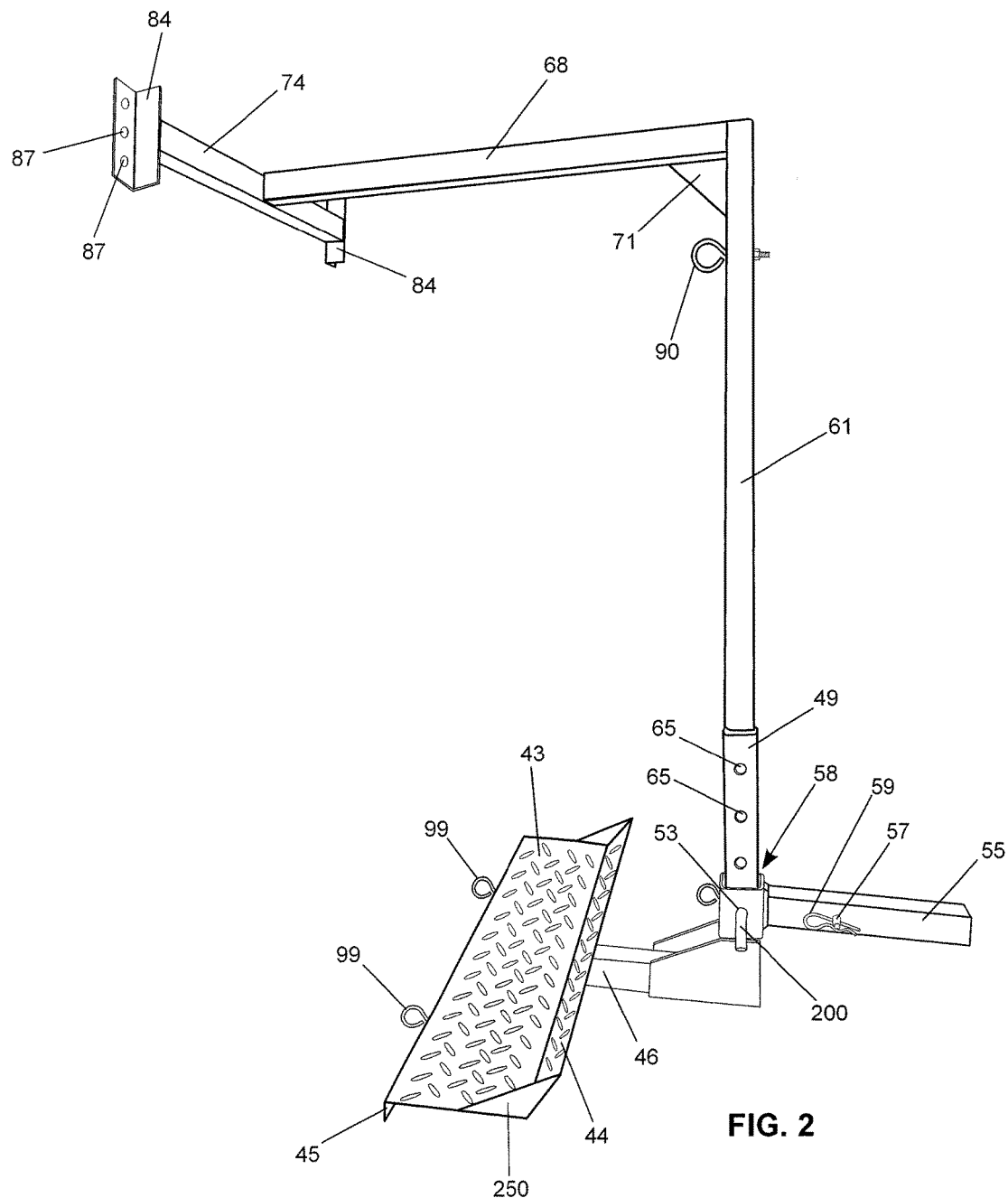
FIG. 2 is a side perspective view of the adjustable height hitch mounted attachment of the present invention.
Figure 5:
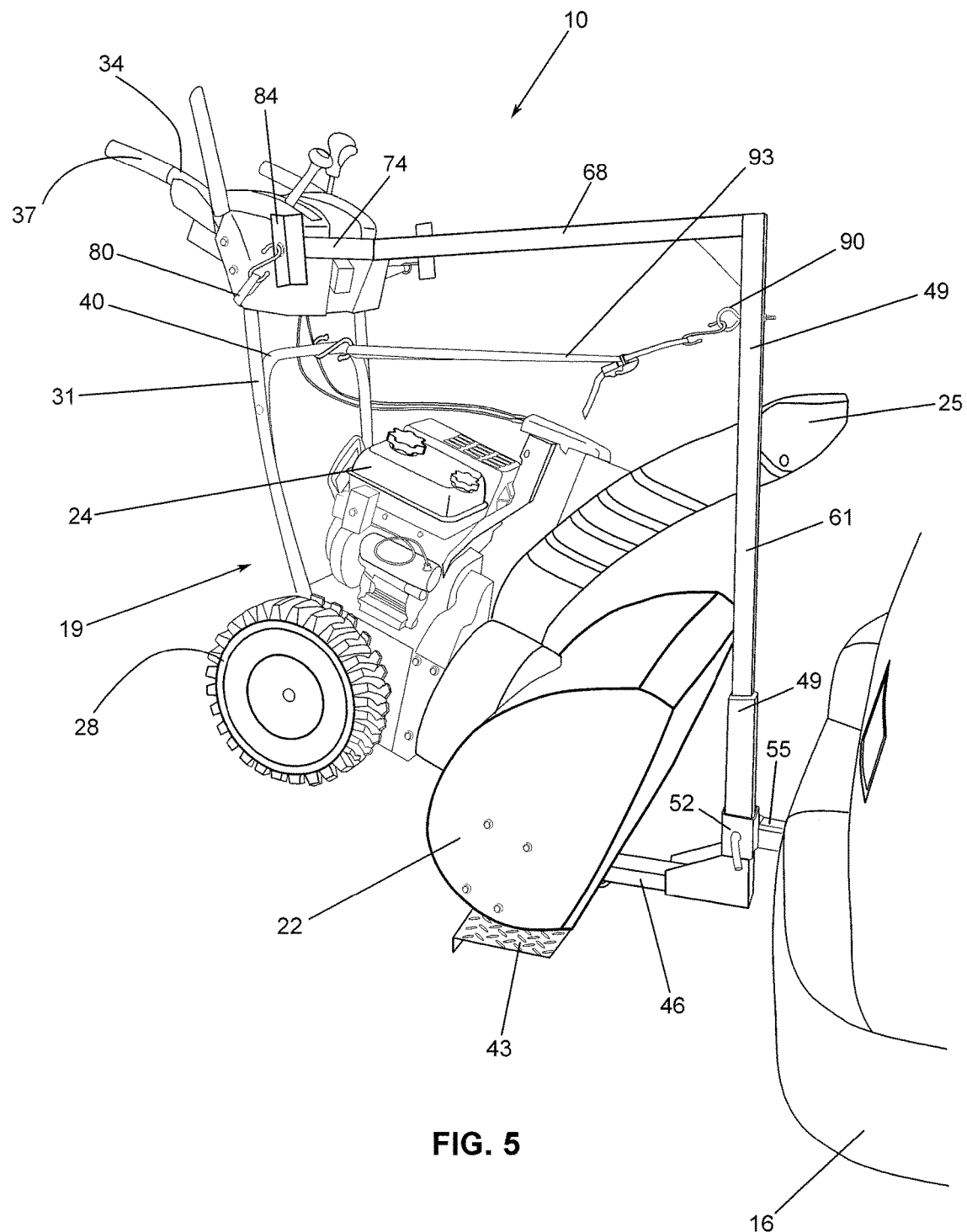
FIG. 5 is a perspective view of the attachment shown in FIG. 2 with a snow blower mounted thereon.

Turning to FIG. 2, the vertical post section 49 supports a second post section 61 that extends upward to a horizontal section 68. As described above, the vertical post section 49 may comprise a hollow member with a vertical opening for receiving the second post section 61. Section 68 may extend horizontally away from the vehicle 16. The second post section 61 and the horizontal section 68 may attach at a ninety degree angle and may include an extra support member such as a gusset 71. Alternatively, the second post section 61 and horizontal section 68 may be formed as a unitary member such as a single curved member forming a ninety degree turn (as shown in FIGS. 6-9). A lateral support bar 74 may be mounted at the end of the horizontal section 68. The lateral support bar 74 provides a mounting surface for engaging arms 31 on the snowblower 19 to secure the snowblower 19 against the attachment 10 as described herein. As shown in FIG. 5, a strap 80 may be used to secure the arms 31 of the snowblower 19 against the lateral support bar 74. The attachment 10 has a base 43 for supporting the front housing 22 of the snow blower 19. The base 43 may be provided with a forward angled section 44 and a rearward angled section 45. Gussets 250 may be provided along the sides of the base 43. The base 43 is supported by a bar 46 that extends horizontally from the vertical post section 49.

Figure 3:
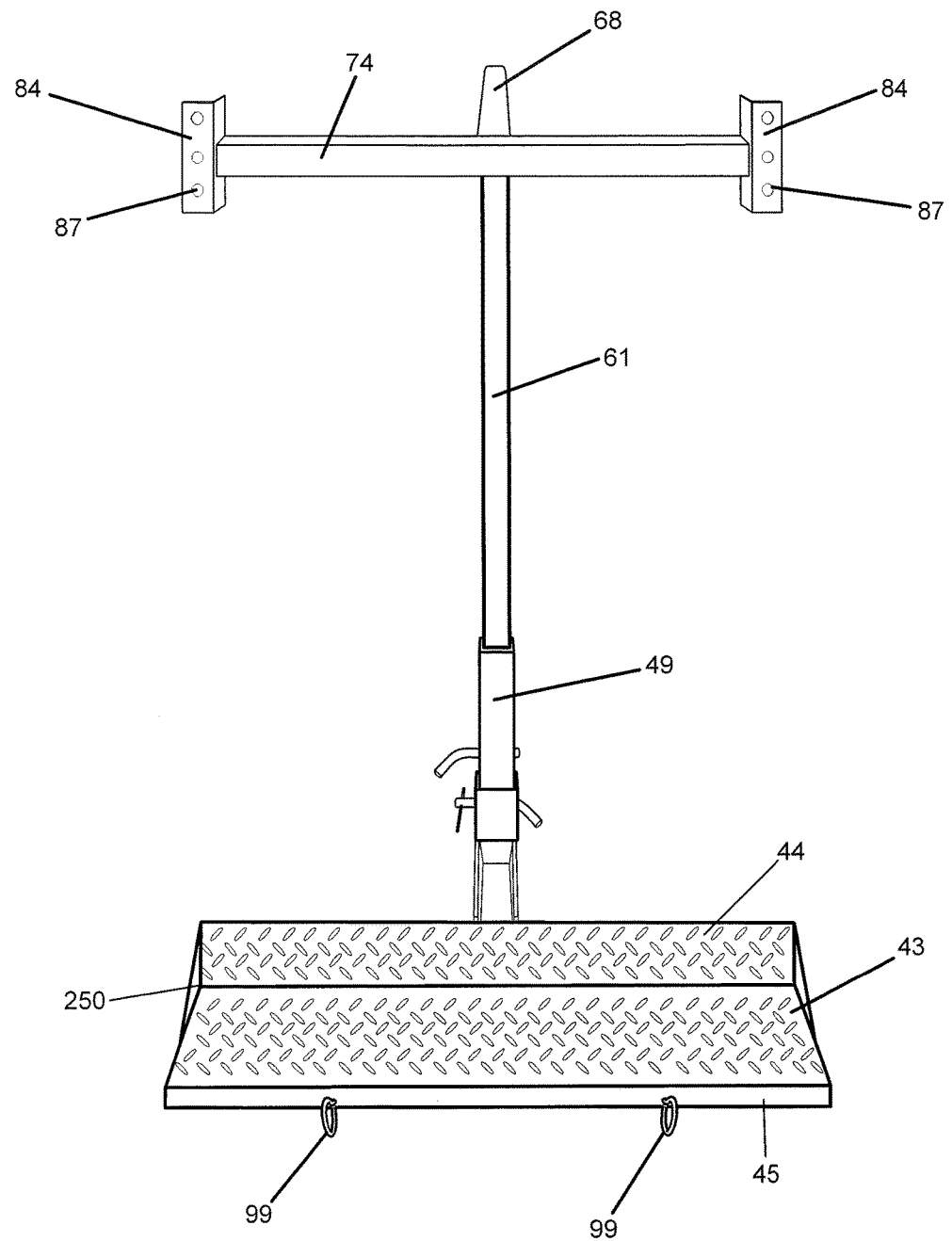
FIG. 3 is a front perspective view of the attachment shown in FIG. 2.
Figure 4:
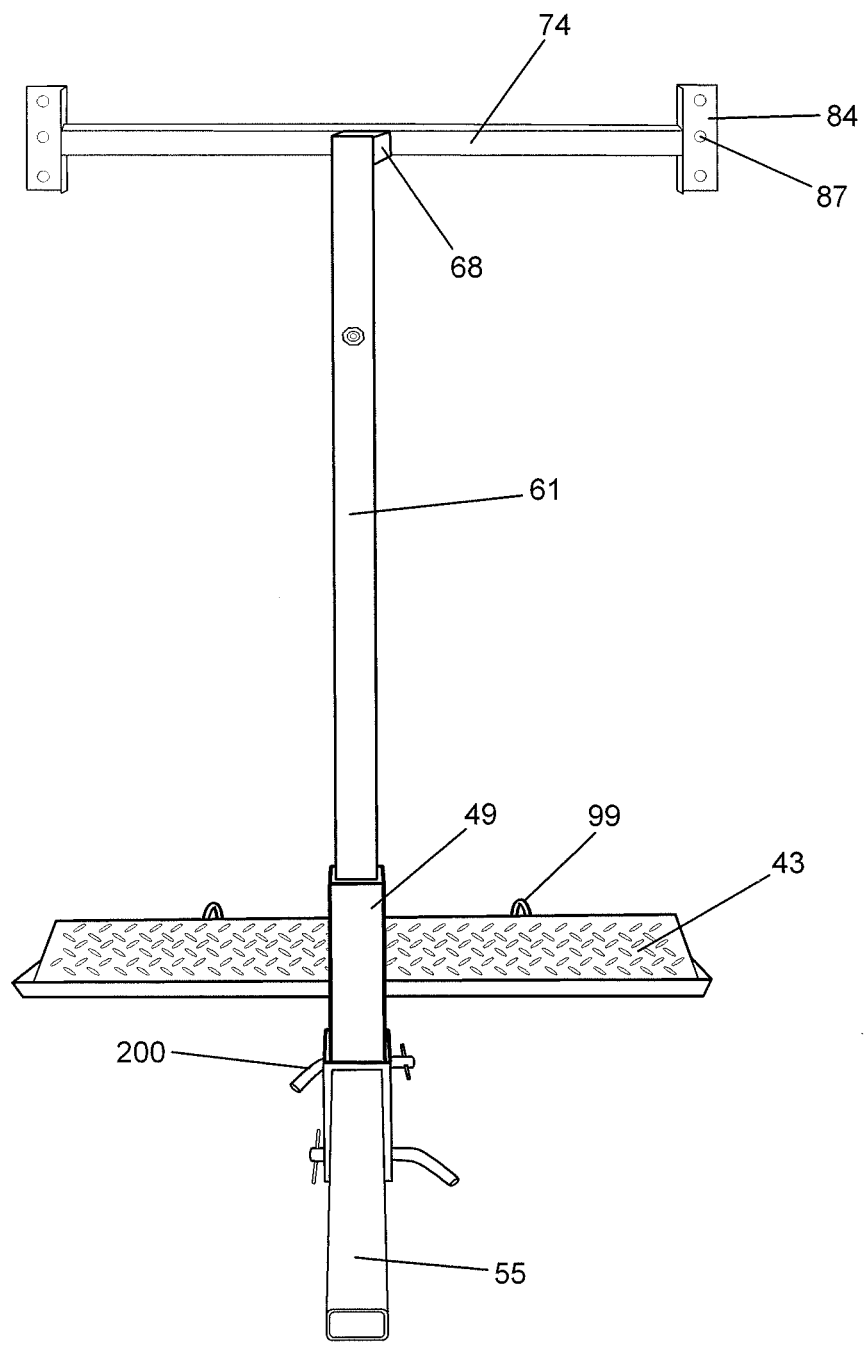
FIG. 4 is a rear perspective view of the attachment shown in FIG. 2.

In FIGS. 3-4, a pair of brackets 84 may be attached to the ends of the bar 74. The brackets 84 may be provided with openings 87 for attaching straps 80 to secure the snowblower 19. Returning to FIG. 2, the second post section 61 may also be provided with an eye hook 90 for attaching a strap 93. The strap 93 may be hooked around the crossbar 40 to provide additional support to secure the snowblower 19 to the attachment 10.

In FIG. 5, the attachment 10 is mounted to the hitch receiver 13 disposed on the vehicle 16. The attachment 10 supports a medium or large-sized walk behind snow blower 19. The snow blower 19 has front housing 22 with a rotating auger disposed therein powered by an engine 24. The snow blower 19 has a chute 25, a set of wheels 28 and arms 31 with handles 34 having grips 37 attached thereto. The arms 31 may be connected by a cross bar 40.

Figure 6:
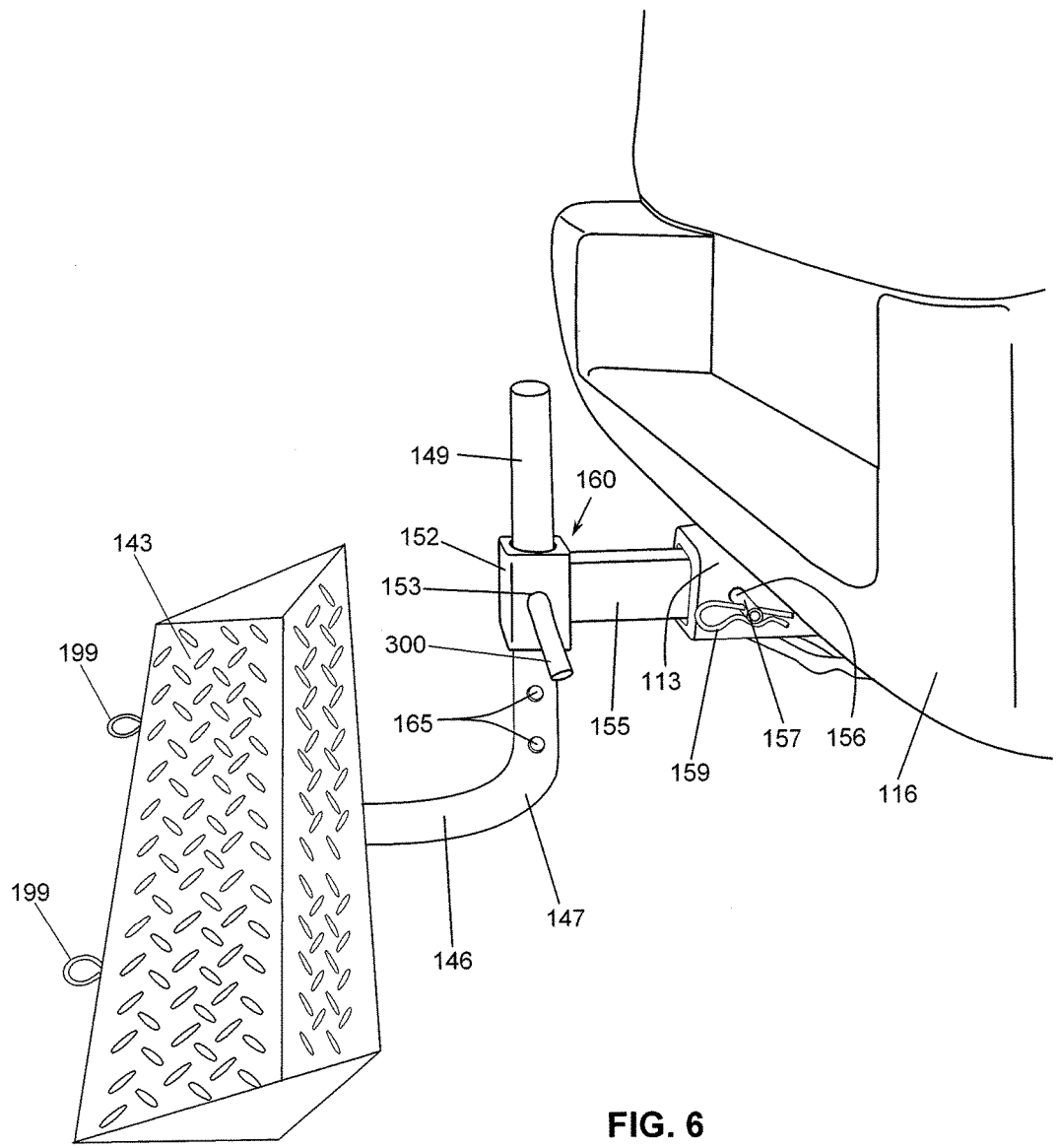
FIG. 6 is a perspective view of a portion of a second embodiment of the adjustable height hitch mounted attachment.

In FIG. 6 an alternate embodiment includes a hitch receiver 113 mounted on a vehicle 116. The hitch receiver 113 has an opening for receiving a horizontal draw bar 155. The drawbar 155 has an outside dimension smaller than the inside dimension of the hitch receiver 113 such that the drawbar 155 is capable of sliding in and out of the opening in the hitch receiver 113 in telescoping fashion. An opening 156 in the hitch receiver 113 aligns with an opening (not shown) in the drawbar 155. A pull pin 157 is inserted through the aligned openings in the drawbar 155 and the hitch receiver 113 to connect the draw bar 155 to the hitch receiver 113. The pull pin 157 may be secured by a cotter pin 159.

The end 160 of the drawbar 155 disposed opposite from the hitch receiver 113 has a collar 152 with a top and a bottom opening that are connected to form a vertical channel through the collar 152. The collar 152 has openings on opposite sides for receiving a pin 300. A base 143 is connected to a post 145 having a lower horizontal portion 146. The post 145 extends from the base 143 to a second post 161. Although a two piece construction for the post is shown, the term "post" is intended to cover any number of sections that may connect together and includes a unitary construction. The post 145 has a horizontal portion 146 that extends to a curved section 147. The curved section 147 extends to a vertical section 149. The post 145 is hollow and has a plurality of openings 165 disposed along its length. The post 145 slides up and down through the vertical channel in the collar 152. Accordingly, the height of the base 143 can be adjusted relative to the ground by sliding the post 145 through the vertical channel in the collar 152 and aligning one of the openings 165 in the post 145 with the openings 153 in the collar 152. Once the openings 165 and 153 are aligned and the height of the base 143 is set at the proper distance from the ground, the pin 300 may be inserted through the aligned openings to fix the position of the base 143 above the ground. If the hitch receiver 113 is raised farther above the ground such as for a large truck or sport utility vehicle, the extra openings 165 provide for adjustment to extend the base 143 closer to the ground. Alternatively, for a car or van the hitch receiver 113 may be closer to the ground. In that case the post 145 does not need to extend as far below the collar 152. The base 143 may also be provided with hooks 199 for attaching straps around a front housing 22 (FIG. 5) to further secure a snowblower 19 to an attachment 10 as described herein.

Figure 7:
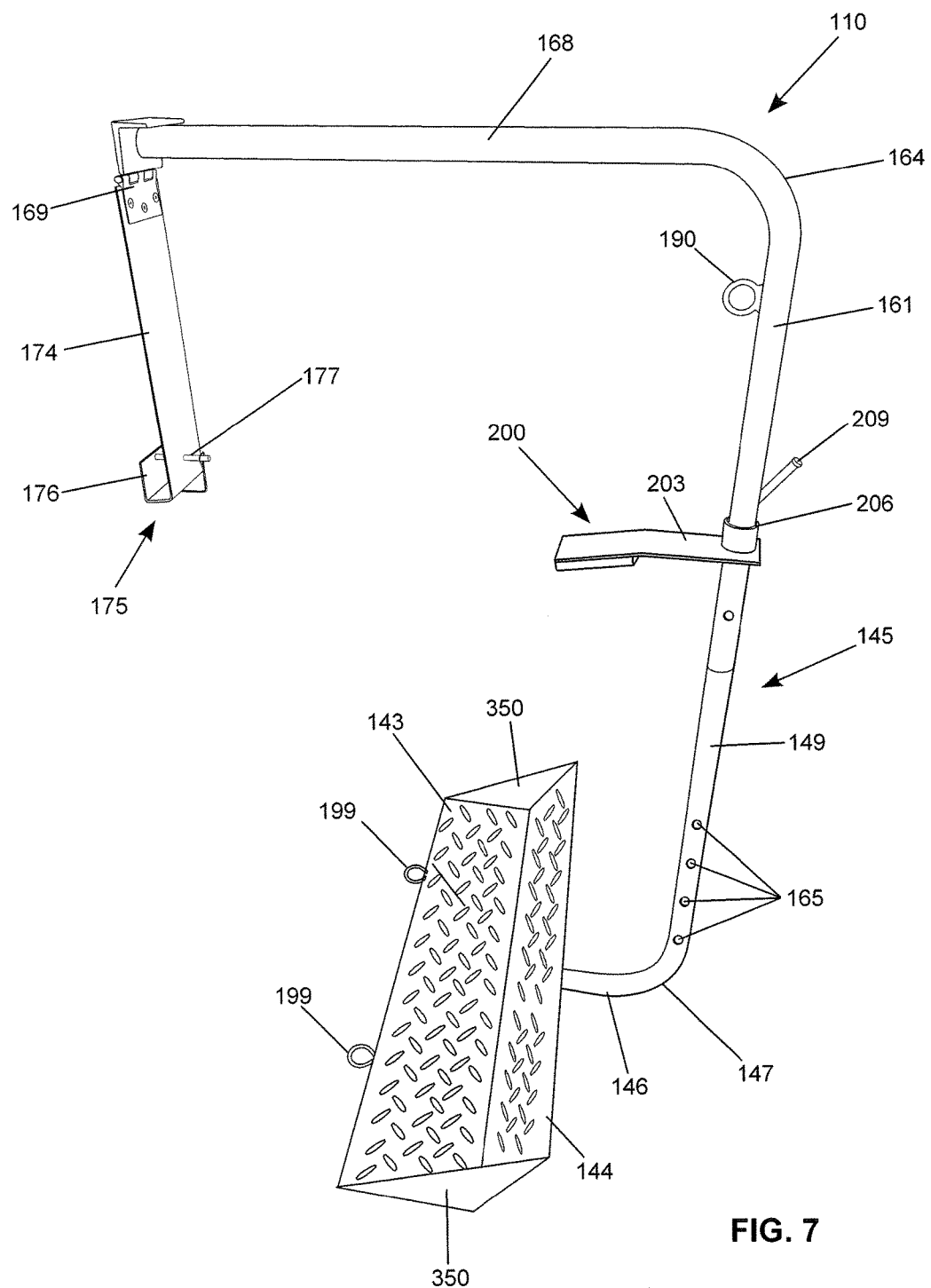
FIG. 7 is a side perspective view of the second embodiment of the attachment.
Figure 8:
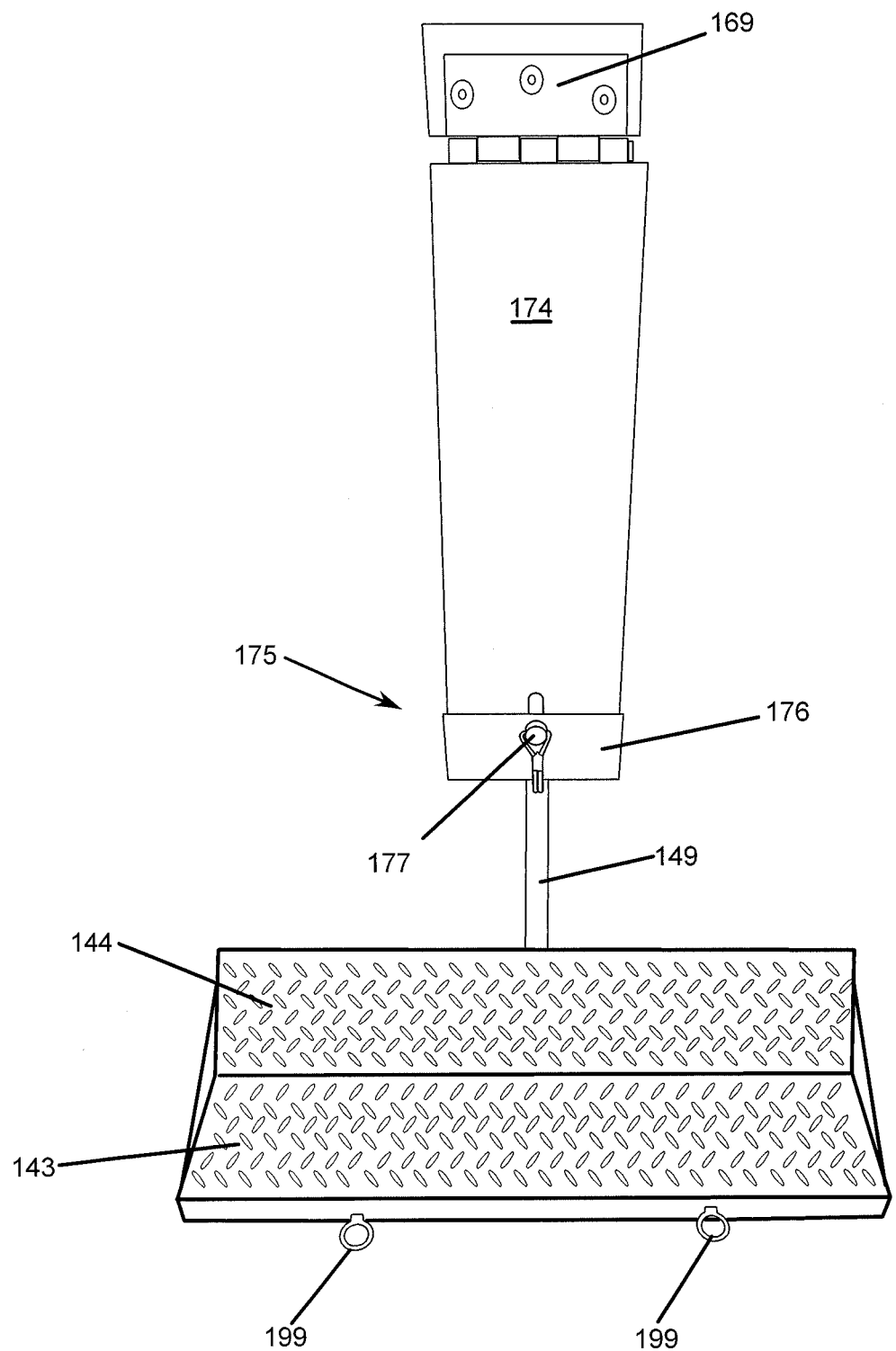
FIG. 8 is a front perspective view of the attachment shown in FIG. 7.
Figure 9:
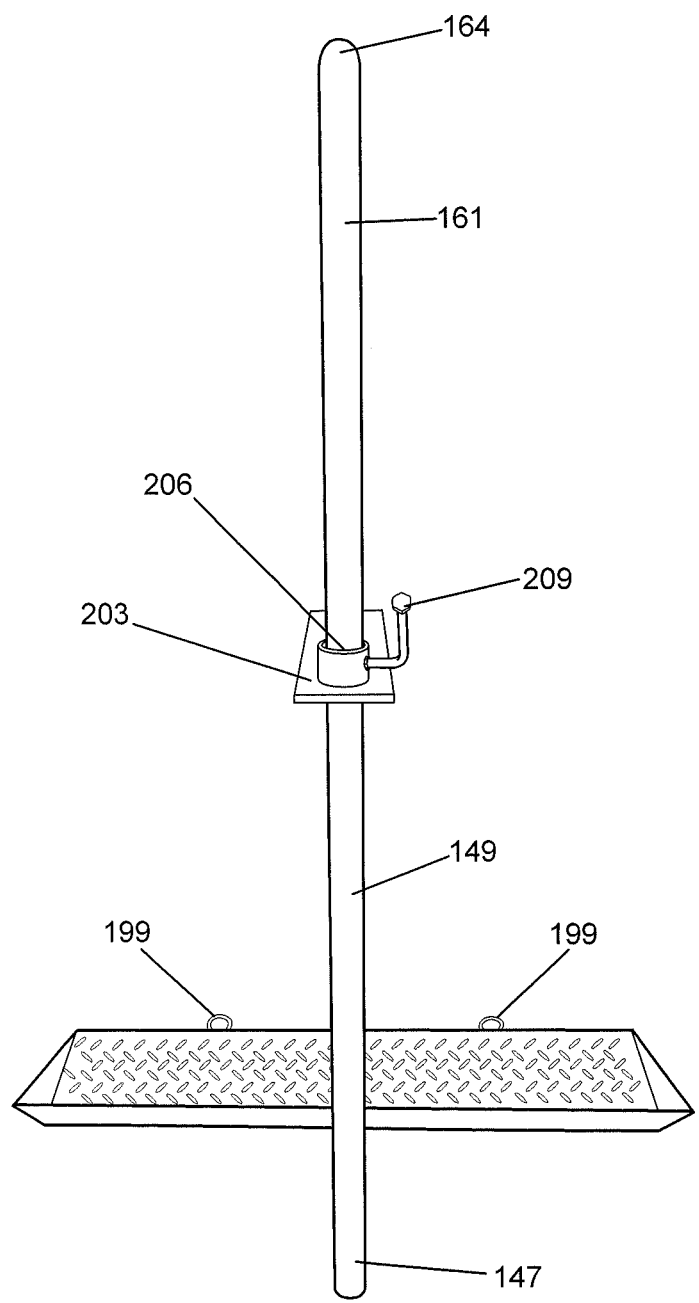
FIG. 9 is a rear perspective view of the attachment shown in FIG. 7.

Turning to FIGS. 7-9, the post 145 connects with post 161 that extends upward to a horizontal section 168. As described above, the post 145 may comprise a hollow member with a vertical opening for receiving the second post 161. Section 168 may extend horizontally away from the vehicle 116. As shown, the post 161 and the horizontal section 168 may be formed as a unitary member such as a single pipe that is curved in section 164 to form a ninety degree turn. A support member 174 may be mounted at the end of the horizontal section 168. The support member 174 may be pivotally attached to horizontal member 168 by means of a hinge 169. A distal end 175 of support member 174 may be formed with a J-shaped section 176 for engaging with the crossbar 40 on the snowblower 19 to secure the snowblower 19 as described herein. The J-shaped section 176 may be provided with a locking pin 177 for retaining the crossbar 40 in the slot formed therein. The attachment 110 has a base 143 for supporting the front housing 22 of the snow blower 19. The base 143 may be provided with a forward angled section 144 and a rearward angled section 145. Gussets 350 may be provided along the sides of the base 143. The base 143 is supported by the horizontal portion 146 that extends horizontally from the upright portion 149. The upright post 161 may also be provided with an eye hook 190 for attaching a strap 93 (FIG. 5). The strap 193 may be hooked around the crossbar 40 to provide additional support to secure the snowblower 19 to the attachment 110. An adjustable retention member 200 is mounted by a bracket 203 onto the vertical post 161. The bracket 203 has an opening 206 defined therein such that the retention member 200 may be moved up and down the post 161. A set screw with a handle 209 attached thereto may be used to lock the retention member into a fixed postion relative to the post 161. After the snowblower 19 is mounted on the base 143 in the position shown in FIG. 5, the retention member 200 is slid down the post 161 until the retention member 200 engages with the top of the front housing 22 of the snowblower 19 and then locked into a fixed position by means of handle 209. The retention member 200 thereby prevents the snowblower 19 from rotating about its pivot point and holds it in position on the attachment 110.

Figure 10:
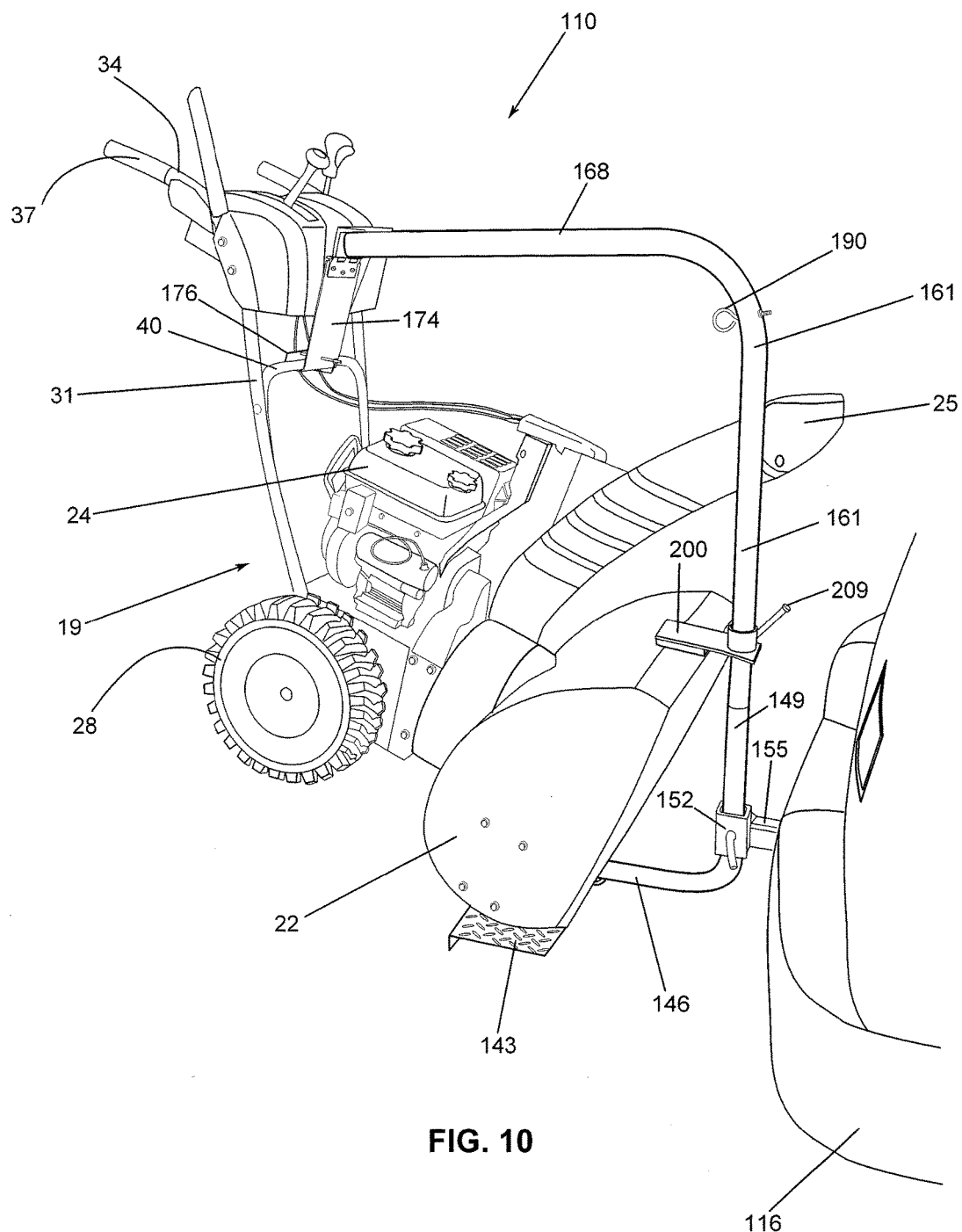
FIG. 10 is a perspective view of the embodiment shown in FIG. 7 with a snow blower mounted thereon.

In FIG. 10, the attachment 110 is mounted to the hitch receiver 113 disposed on the vehicle 116. The attachment 110 supports a medium or large-sized walk behind snow blower 19. The snow blower 19 has front housing 22 with a rotating auger disposed therein powered by an engine 24. The snow blower 19 has a chute 25, a set of wheels 28 and arms 31 with handles 34 having grips 37 attached thereto. The arms 31 may be connected by a cross bar 40. As shown, the cross bar 40 is disposed in the J-shaped section 176 of support member 174 and the retention member 200 is engaged with the front housing 22 to prevent the snow blower 19 from rotating off of the base 143.

The present invention provides for easily transporting larger snowblowers without requiring heavy lifting. The snowblower 19 can be tilted back on its wheels 28 and then pushed forward such that the housing rests on the base 143. Once the front housing 22 of the snowblower 19 is positioned on the base 143, the snowblower 19 can be tilted forward by pushing forward on the arms 131. The arms 131 are pushed forward until the J-shaped portion 176 reaches the crossbar 40. The crossbar 40 is then hooked into the J-shaped portion 176. The leverage gained by positioning the front housing 22 on the base plate 143 makes lifting the snowblower 19 onto the attachment safe and easy. Once the snowblower 19 is positioned on the attachment 110, the retention member 200 is slid down into engagement with the top of the front housing 22 and locked into position. In addition, straps, chains or the like can be added to further secure the load for safely transporting the snowblower 19.

The present invention contemplates that many changes and modifications may be made. Therefore, while the presently-preferred form of the attachment has been shown and described, and several modifications and alternatives discussed, persons skilled in this art will readily appreciate that various additional changes and modifications may be made without departing from the spirit of the invention, as defined and differentiated by the following claims.

What is claimed is:

1. An attachment for mounting onto a hitch receiver on a vehicle, the attachment for transporting a snow blower, the snow blower having wheels, a front housing and a pair of arms, the attachment comprising:
   a drawbar having a first end and a second end; the first end configured and arranged to mount into the hitch receiver, the second end supporting a base and a post, the post having a distal end with a support surface, the support surface spaced apart horizontally and vertically from the base;
   wherein the base is disposed in spaced apart relation to the post such that the base is configured to receive the front housing of the snow blower to establish a pivot point as the arms of the snowblower are rotated forward about the pivot point until the arms of the snow blower are disposed adjacent to the support surface.

2. The attachment of claim 1, wherein the post is configured and arranged to adjustably mount to the drawbar such that the height of the base above the ground is adjustable when the draw bar is mounted in the hitch receiver.

3. The attachment of claim 1, wherein the support surface is disposed above the base and disposed a greater distance laterally from the hitch receiver than the base.

4. The attachment of claim 1, wherein the support surface is disposed on a cross bar.

5. The attachment of claim 1, wherein the support surface is formed by a pivoting support member.

6. The attachment of claim 1, further comprising an eye hook attached to the post.

7. An attachment for mounting on a hitch receiver and for transporting a snow blower, the snow blower having wheels, a front housing, and a pair of arms, the attachment comprising:

a drawbar having a first end and a second end disposed opposite from the first end, the first end configured and arranged to engage with the hitch receiver, the second end having a collar with a vertical opening extending therethrough, the collar having openings defined therein;

an L-shaped member having a base mounted at a first end of a first portion and having a hollow second portion having a plurality of side openings defined therein;

a pin for adjustably connecting the L-shaped member to the collar, the pin configured and arranged to extend through the plurality of side openings in the collar and the openings in the L-shaped member;

an elongate post configured and arranged to attach to the second portion of the L-shaped member, the post extending vertically and horizontally from a proximal end at the second portion of the L-shaped member to a distal end;

a lateral support member disposed at the distal end of the upright member;

wherein the base is configured and arranged to support the front housing of the snow blower and establish a fulcrum as the arms of the snow blower are rotated forward until the snow blower makes contact with the lateral support member.

8. The attachment of claim 7, wherein the post is configured and arranged to adjustably mount to the drawbar such that the height of the base above the ground is adjustable when the draw bar is mounted in the hitch receiver.

9. The attachment of claim 7, wherein the support surface is disposed above the base plate and disposed a greater distance laterally from the hitch receiver than the base.

10. The attachment of claim 7, wherein the lateral support member is a cross bar.

11. The attachment of claim 10, wherein the cross bar has a plate with a plurality of openings defined therein.

12. The attachment of claim 7, further comprising an eye hook attached to the post.

13. An attachment for mounting onto a hitch receiver on a vehicle, the attachment for transporting a snow blower, the snowblower having wheels, a front housing, a pair of arms, and a cross bar disposed between the arms, the attachment comprising:

a drawbar having a first end and a second end, the first end configured and arranged to mount into the hitch receiver;

a post having a first end and a second end opposite the first end, the post mounted to the second end of the drawbar;

a base attached to the first end of the post;

a support member pivotally attached to the second end of the post, the support member having a J-shaped portion at a distal end, the J-shaped portion configured and arranged to receive the cross bar on the snowblower when the snowblower is mounted on the base;

a retention member configured and arranged to mount to the post and to slide relative thereto, the retention member extending laterally from the post such that when the snowblower is mounted on the base the retention member can be fixed at a position on the post where the retention member engages with the top of the front housing on the snowblower to prevent rotation of the front housing relative to the base.

14. The attachment of claim 13, wherein the post is configured and arranged to adjustably mount to the drawbar such that the height of the base above the ground is adjustable when the draw bar is mounted in the hitch receiver.

15. The attachment of claim 13, wherein the support surface is disposed above the base and disposed a greater distance laterally from the hitch receiver than the base.

16. The attachment of claim 13, wherein the support member is attached to the post by a hinge.

17. The attachment of claim 13, further comprising a retaining pin for securing the cross bar in the J-shaped portion.

18. The attachment of claim 13, further comprising a set screw for locking the retention member to the post.

19. The attachment of claim 13, wherein the post is constructed of hollow tubing.

20. The attachment of claim 13, wherein the base has at least one eye hook disposed thereon.

21. An attachment for mounting onto a hitch receiver on a vehicle, the attachment for transporting a snow blower, the snowblower having wheels, a front housing, a pair of arms, and a cross bar disposed between the arms, the attachment comprising:

a drawbar having a first end and a second end, the first end configured and arranged to mount into the hitch receiver;

a post having a first end and a second end opposite the first end, the post mounted to the second end of the drawbar;

a base attached to the first end of the post; and, a support member pivotally attached to the second end of the post, the support member having a J-shaped portion at a distal end, the J-shaped portion configured and arranged to receive the cross bar on the snowblower when the snowblower is mounted on the base.

* * * * *